US008520249B2

(12) United States Patent
Muto et al.

(10) Patent No.: US 8,520,249 B2
(45) Date of Patent: Aug. 27, 2013

(54) IMAGE PROCESSING APPARATUS AND METHOD OF CONTROLLING SAME

(75) Inventors: Tsuyoshi Muto, Yokohama (JP); Tomoaki Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1158 days.

(21) Appl. No.: 11/751,557

(22) Filed: May 21, 2007

(65) Prior Publication Data
US 2007/0285717 A1 Dec. 13, 2007

(30) Foreign Application Priority Data

Jun. 8, 2006 (JP) ................................ 2006-160312

(51) Int. Cl.
G06F 3/12 (2006.01)
G06K 15/00 (2006.01)
(52) U.S. Cl.
USPC ....... 358/1.16; 358/1.13; 358/1.14; 358/1.15; 399/18; 399/19; 399/20; 399/21; 399/22; 399/23
(58) Field of Classification Search
None
See application file for complete search history.

(56) References Cited

U.S. PATENT DOCUMENTS 6,570,605 B1 * 5/2003 Kashiwazaki ................ 347/264
7,154,619 B1 * 12/2006 Yoshida et al. .............. 358/1.14
2004/0057066 A1 * 3/2004 Sugishita et al. ............ 358/1.13
2004/0165209 A1 * 8/2004 Aoki et al. ................... 358/1.14
2006/0044593 A1 * 3/2006 Kawakami et al. .......... 358/1.14
2006/0215218 A1 * 9/2006 Ujigawa ....................... 358/1.15
2006/0268310 A1 * 11/2006 Tamai et al. ................. 358/1.14

FOREIGN PATENT DOCUMENTS

JP 2000181735 * 6/2000

OTHER PUBLICATIONS

System for Batch..Fault; Hatano Nobuhiro; JP Pub date Jun. 2000; Machine translation in english for JP Pub No. 2000-181735.*

* cited by examiner

Primary Examiner — Benny Q Tieu
Assistant Examiner — Haris Sabah
(74) Attorney, Agent, or Firm — Fitzpatrick, Cella, Harper & Scinto

(57) ABSTRACT

A procedure through which a device is started up when power is introduced is fixed. Consequently, if there is a job that has been suspended owing to cut-off of power the length of time from re-introduction of power to resumption of the suspended job is too long. In order to solve this problem, an image processing apparatus, which enables execution of a plurality of jobs by starting up a plurality of software modules, is so adapted that in a case where a job being executed is suspended, execution information indicating status of execution of the job at the time of suspension is stored. The suspended job is resumed based on the execution information. Specifically, in resuming the suspended job, a group of software modules relating to the suspended job is started up before other software modules.

22 Claims, 12 Drawing Sheets

FIG. 5

| JOB ID 1102 | JOB TYPE 1103 | PHASE 1104 | FOLDER OF IMAGE FILE 1105 | JOB SETTINGS INFORMATION FILE 1106 |
|---|---|---|---|---|
| 2001 | ScanToSend | AFTER END OF SCAN | /IMAGE/2001 | /JobSpec/2001.spec |
| 2002 | ScanToSend | BEFORE END OF SCAN | /IMAGE/2002 | /JobSpec/2002.spec |

| JOB TYPE | PHASE | SOFTWARE MODULE |
|---|---|---|
| "SCAN TO SEND" JOB | BEFORE END OF SCAN | /MODULE/Scan.so(SCAN MODULE) |
| | | /MODULE/Scan.so(TRANSMIT MODULE) |
| | | /MODULE/ImageMng.so(IMAGE MANAGEMENT MODULE) |
| | | /MODULE/UI.so(CONTROL SCREEN MODULE) |
| | AFTER END OF SCAN | /MODULE/Scan.so(TRANSMIT MODULE) |
| | | /MODULE/ImageMng.so(IMAGE MANAGEMENT MODULE) |
| Scan to Print JOB | BEFORE END OF SCAN | /MODULE/Scan.so(SCAN MODULE) |
| | | /MODULE/Print.so(PRINT MODULE) |
| | | /MODULE/ImageMng.so(IMAGE MANAGEMENT MODULE) |
| | | /MODULE/UI.so(CONTROL SCREEN MODULE) |
| | AFTER END OF SCAN | /MODULE/Print.so(PRINT MODULE) |
| | | /MODULE/ImageMng.so(IMAGE MANAGEMENT MODULE) |
| PDL Print JOB | BEFORE END OF RIP | /MODULE/PDL.so(RIP MODULE) |
| | | /MODULE/Print.so(PRINT MODULE) |
| | | /MODULE/ImageMng.so(IMAGE MANAGEMENT MODULE) |
| | AFTER END OF RIP | /MODULE/Print.so(PRINT MODULE) |
| | | /MODULE/ImageMng.so(IMAGE MANAGEMENT MODULE) |

FIG. 9

| START-UP MODULE LIST |
|---|
| /MODULE/ImageMng.so(IMAGE MANAGEMENT MODULE) |
| /MODULE/Send.so(TRANSMIT MODULE) |
| /MODULE/Send.so(FAX MODULE) |
| /MODULE/Send.so(SCAN MODULE) |
| /MODULE/Print.so(PRINT MODULE) |
| /MODULE/PDL.so(RIP MODULE) |
| /MODULE/UI.so(CONTROL SCREEN MODULE) |

1301

| JOB ID 1102 | JOB TYPE 1103 | PHASE 1104 | FOLDER OF IMAGE FILE 1105 | JOB SETTINGS INFORMATION FILE 1106 |
|---|---|---|---|---|
| 3005 | ScanToPrint | BEFORE END OF SCAN | /IMAGE/3005 | /JobSpec/3005.spec |
| 4021 | PDLPrint | BEFORE END OF RIP | /IMAGE/4021 | /JobSpec/4021.spec |
| 2001 | ScanToSend | AFTER END OF SCAN | /IMAGE/2001 | /JobSpec/2001.spec |

IMAGE PROCESSING APPARATUS AND METHOD OF CONTROLLING SAME

BACKGROUND OF THE INVENTION

1. Field of the Invention

The present invention relates to an image processing apparatus and method of controlling the same. More particularly, the invention relates to an image processing apparatus and method of controlling the same in which it is possible to resume a job that has been suspended during execution.

2. Description of the Related Art

If supply of power to an image processing apparatus is cut off unexpectedly during execution of a job and the job is suspended as a result, it is preferable that resumed execution of the suspended job be possible the next time supply of power is restored. The specification of Japanese Patent Laid-Open No. 2000-181735 discloses a technique in which information indicating the progress of a job is stored in a non-volatile storage unit when the job is executed, and the job is resumed automatically based on the progress information read out of the storage unit upon resumption of the job.

In an embedded device such as a copier or printer, it is required that the time needed to respond to a request fall within fixed limits. In order to achieve this, an embedded real-time operating system (referred to as a "real-time OS" below) that emphasizes a real-time feature is used. With a conventional real-time OS, it is required that enough memory capacity for all applications that run at one time be reserved in physical memory. Consequently, the storage capacity of installed physical memory is continuing to increase as more functions are added to recent embedded devices.

In the prior art, however, the procedure followed to start up an apparatus is fixed regardless of whether a suspended job is waiting when power is re-introduced. Accordingly, in a case where a job has been suspended owing to cut-off of power, etc., all software modules including those unrelated to the suspended job are loaded in a prescribed sequence until the job is resumed. As a consequence, the length of time from re-introduction of power to resumption of the job is too long and the execution of new jobs is delayed. The result is a decline in productivity.

SUMMARY OF THE INVENTION

The present invention enables realization of an image processing apparatus and method of controlling same that shorten the time needed to resume a suspended job when power is introduced.

According to the present invention, the foregoing problem is solved by providing an image processing apparatus for enabling execution of a plurality of jobs by starting up a plurality of software modules, the image processing apparatus comprising:

a non-volatile storage unit which, in a case where a job being executed is suspended, is adapted to store execution information indicating status of execution of the job at the time of suspension; and a job resuming unit adapted to resume the suspended job based on the execution information when power starts being supplied to the image processing apparatus;

wherein the job resuming unit loads software modules relating to the suspended job from the non-volatile storage unit to a volatile storage unit and starts up these software modules before other software modules.

According to another aspect of the present invention, the foregoing problem is solved by providing a method of controlling an image processing apparatus for enabling execution of a plurality of jobs by starting up a plurality of software modules, the method comprising the steps of:

in a case where a job being executed is suspended, storing execution information, which indicates status of execution of the job at the time of suspension, in a non-volatile storage unit; and resuming the suspended job based on the execution information when power starts being supplied to the image processing apparatus;

wherein the job resuming step includes loading software modules relating to the suspended job from the non-volatile storage unit to a volatile storage unit and starting up these software modules before other software modules.

Further features of the present invention will become apparent from the following description of exemplary embodiments (with reference to the attached drawings).

BRIEF DESCRIPTION OF THE DRAWINGS

FIG. 5 is a diagram illustrating an example of job execution information in this embodiment;

FIG. 7 is a diagram illustrating an example of a combined list of software modules in this embodiment;

FIG. 9 is a diagram illustrating an example of a start-up module list in this embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

[Apparatus Configuration]

Figure 1:
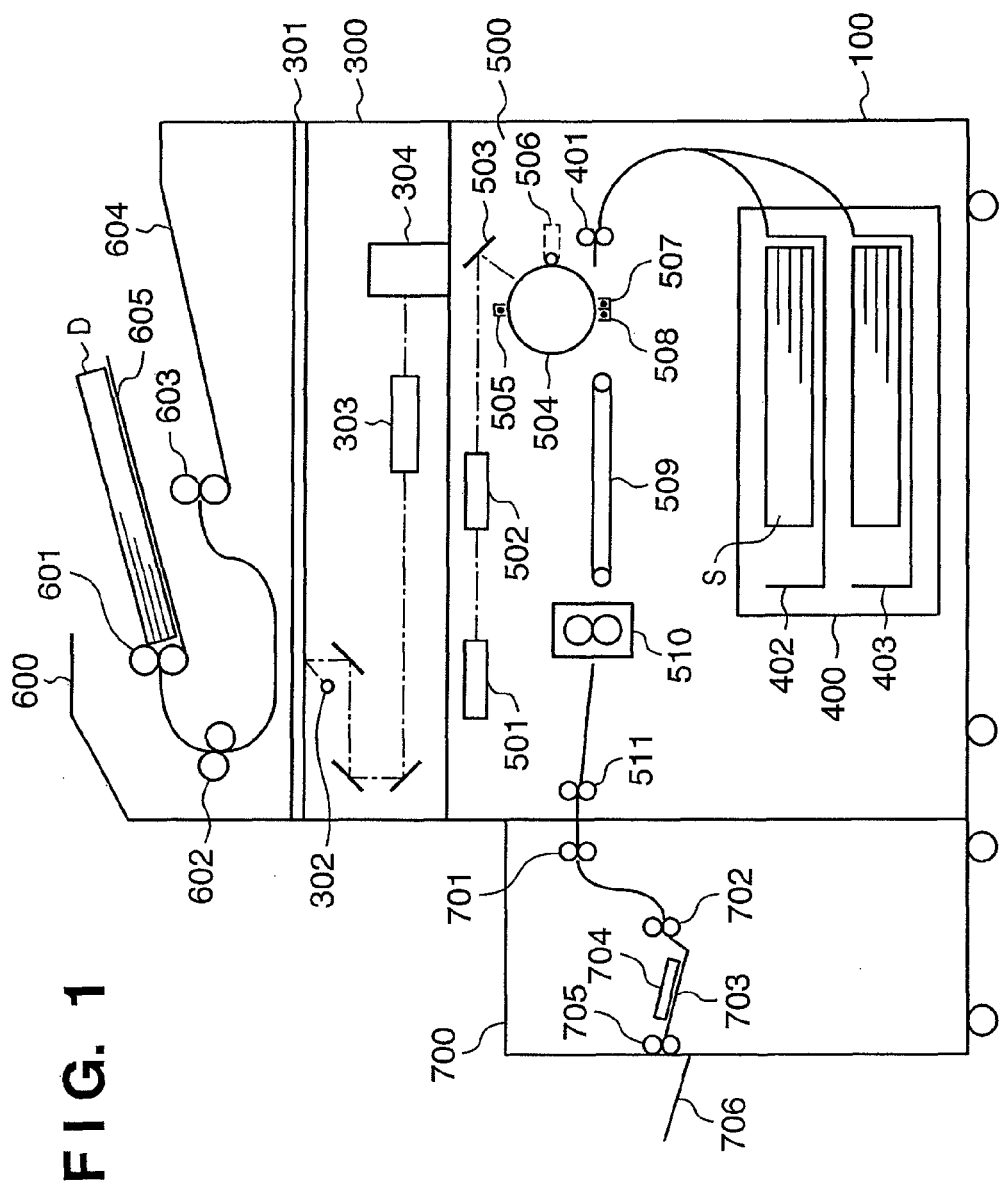
FIG. 1 is a diagram illustrating the overall configuration of an image forming apparatus according to an embodiment of the present invention.

FIG. 1 is a diagram illustrating the overall configuration of an image forming apparatus 100 according to the embodiment of the present invention. The image forming apparatus 100 includes a document reader 300, a paper supply unit 400, an image forming unit 500, a document feeder 600, and a sheet processing unit 700. The document reader 300 is provided with a control panel 200, which is not shown in FIG. 1. A controller 800, which is not shown in FIG. 1, is provided inside the image forming apparatus 100.

If the user uses the control panel 200 to issue a command to start scanning or to start copying of a document, the command is sent to the controller 800. The controller 800 instructs the document reader 300 to start reading the image from the document. In response, a document D that has been placed on a document supply tray 605 of the document feeder 600 is separated one sheet at a time by separation rollers 601 and the sheets are transported to and placed on a document glass 301 by transport rollers 602. The document D that has traversed the document glass 301 is ejected onto a paper-drop tray 604 by ejection rollers 603.

The document D that has traversed the document glass 301 is illuminated with light from a light source 302. Light reflected from the document D is read as image data by a CCD image sensor 304 via a lens system 303. The image data that has been read by the CCD image sensor 304 is transferred to the controller 800 and is then stored on a hard-disk drive 1004, described later.

Image data that has been stored on the hard-disk drive 1004 is sent to a laser output unit 501 in the image forming unit 500. The laser output unit 50 outputs a laser beam that is based on the image data. The output laser beam passes through an image-forming lens system 502 and is reflected by a mirror 503, thereby forming an image on the surface of a photoconductive drum 504.

The photoconductive drum 504 is charged in advance by a primary charging device 505. An electrostatic latent image is formed owing to irradiation with the laser light and is developed by a developing unit 506, whereby a toner image is formed.

A sheet S supplied from the paper supply unit 400 is corrected for skew by registration rollers 401 and is supplied to the image forming unit 500 at the proper timing.

The toner image on the photoconductive drum 504 in the image forming unit 500 is transferred to the supplied sheet S by a transfer charging unit 507. The sheet S to which the toner image has been transferred is separated from the photoconductive drum 504 by a separation charging device 508.

The sheet S separated from the drum is transported to a fixing unit 510 by a transport unit 509. The fixing unit 510 fixes the toner image to the sheet S permanently by applying heat and pressure. The sheet S on which the image has been fixed is transported to the sheet processing unit 700 by ejection rollers 511.

The sheet S that has been transported to the sheet processing unit 700 is transported to a processing tray 703 by transport rollers 701, 702. Sheets S transported to the processing tray 703 one after another are stacked into a bundle by a stacking member 704. The stack of sheets is stapled by a stapling unit (not shown) as necessary in accordance with a command from the user. The sheets are dropped onto a drop tray 702 by batch discharging rollers 705.

One set of copies of document D is completed by the processing described above. This processing is repeated in order for the user to obtain the desired number of copies.

Figure 2:
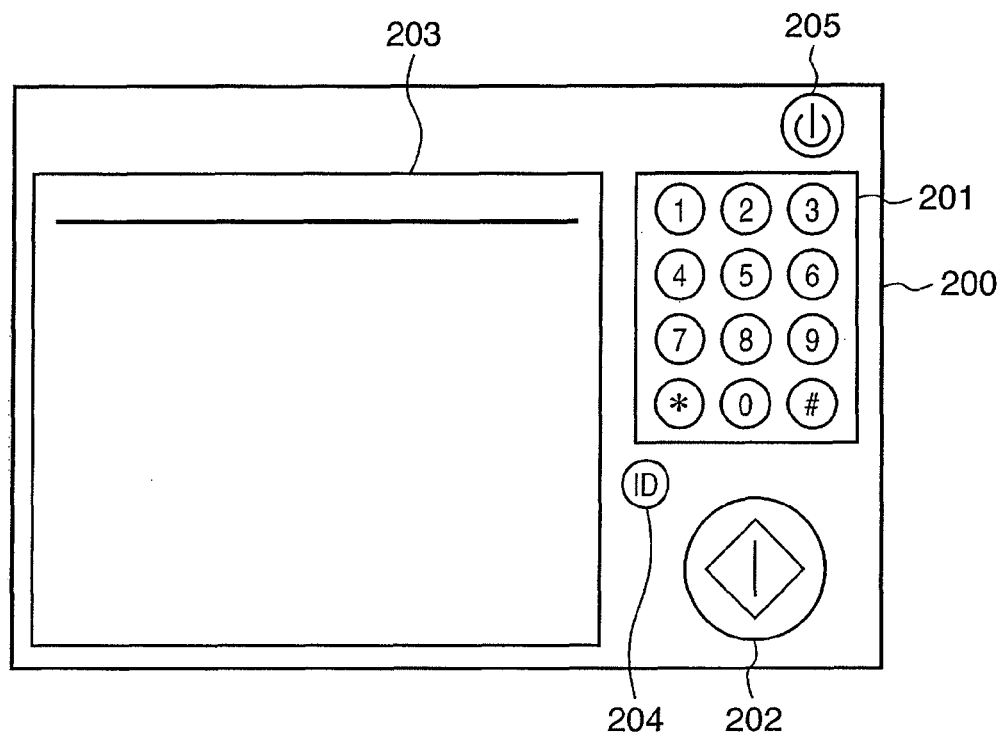
FIG. 2 is a diagram illustrating a control panel provided on the image forming apparatus according to this embodiment.

FIG. 2 illustrates the structure of the control panel 200. As shown in FIG. 2, the control panel 200 includes a numeric keypad 201, a start key 202, a touch-sensitive panel 203, an ID key 204 and a power key 205. The image processing apparatus according to this embodiment employs a soft switch mechanism. Even if the power key 205 is pressed, therefore, a power-supply circuit is not directly opened mechanically. That is, the arrangement is such that by executing prescribed software, the internal power-supply circuit is opened after a series of prescribed operations.

Figure 3:
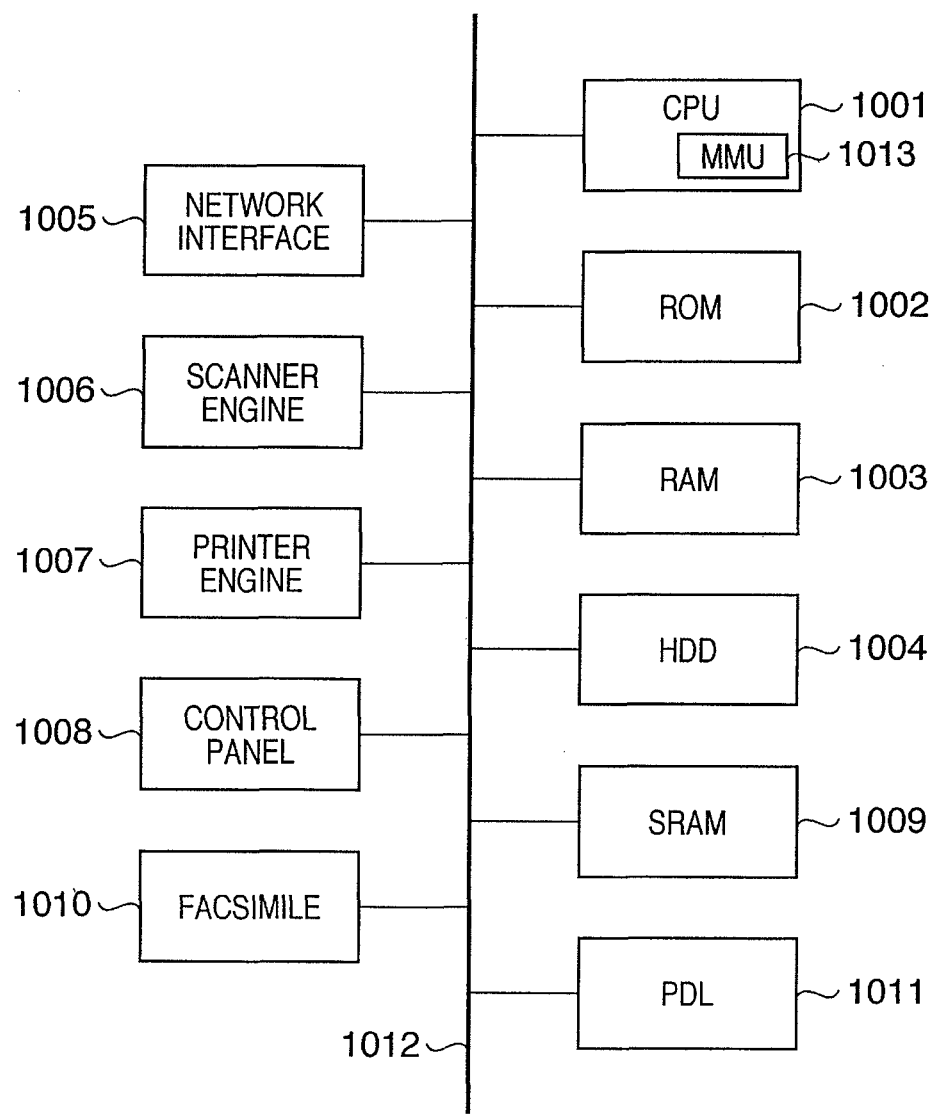
FIG. 3 is a block diagram illustrating the structure of a controller according to this embodiment.

FIG. 3 is a block diagram illustrating the structure of the controller 800 in this embodiment. As shown in FIG. 3, the controller 800 includes a central processing unit (CPU) 1001 for controlling the overall apparatus and performing various computations; a read-only memory (ROM) 1002 storing a program for starting up the system; and a random-access memory (RAM) 1003 used as an area for storing an operating system loaded from a secondary memory and programs such as applications, a work area and a buffer for the CPU 1001 and an image memory. Here the RAM 1003 is also referred to as volatile storage unit, a volatile memory or a volatile unit. Accordingly, the RAM 1003 does not possess a back-up power supply, etc., and therefore signifies storage unit that is incapable of retaining data in the event that the main power supply of the image processing apparatus is cut off. A hard-disk drive (HDD) 1004 stores the program that controls the system and a large quantity of image data, the amount of which is comparatively large. The hard-disk drive 1004 is also referred to as non-volatile storage unit, a non-volatile memory or a non-volatile unit. Accordingly, the hard-disk drive 1004 signifies storage unit that is capable of retaining data even in the event that the main power supply of the image processing apparatus is cut off.

The apparatus further includes a network interface (network I/F) 1005 for interfacing the network; a scanner engine (which corresponds to the document reader 300 and document feeder 600 shown in FIG. 1) 1006 that actually executes processing for reading in an image; a printer engine 1007 (which corresponds to the paper supply unit 400, image forming unit 500 and sheet processing unit 700 shown in FIG. 1) 1007 that actually executes print processing; a control panel (which corresponds to the control panel 200 shown in FIG. 1) 1008, which has a touch-sensitive panel and various keys, etc., for displaying information for viewing by the user and for accepting command inputs from the user; and a static random-access memory (SRAM) 1009 having a dedicated power source so that stored data will not be erased even when power is cut off. In a manner similar to that of the hard-disk drive 1004, the SRAM 1009 indicates storage unit capable of retaining data even in a case where the main power supply of the image processing apparatus is cut off. The apparatus further includes a facsimile unit 1010 that expands compressed image data received via a telephone line and transfers the expanded image data to the hard-disk drive 1004, and that compresses image data transferred from the hard-disk drive 1004 and transmits the compressed image data via the telephone line; a PDL processor 1011 for expanding PDL data into image data; and an internal bus 1012 that interconnects the above-mentioned components so that data may be sent and received among them.

The CPU 1001 incorporates a memory management unit (MMU) 1013. By using the MMU 1013, physical memory can be managed upon being divided into blocks referred to as pages or segments, and the blocks can be assigned to logical address space. If physical memory is inadequate, the hard-disk drive 1004 serving as secondary storage is allocated to logical address space, thereby enabling virtual memory space, which is larger than the physical memory, to be supplied to applications running on the operating system.

The operating system run by the CPU 1001 operates in concert with the MMU 1013. If a program has accessed a logical address, the MMU 1013 converts the logical address to a physical address and determines whether the physical address obtained by the conversion is an address in physical memory. If an address is a physical address, the MMU 1013 accesses the physical memory. If an address is not a physical address, on the other hand, then the MMU 1013 hands over control to the operating system, reads in (swaps in) the block required by the operating system from the hard-disk drive 1004 to the physical memory and then returns control to the MMU 1013. In a case where there is not enough free space in physical memory to read in the block, the operating system writes (swaps out) unnecessary blocks to the hard-disk drive 1004.

[Control at Cut-Off of Power]

Figure 4:
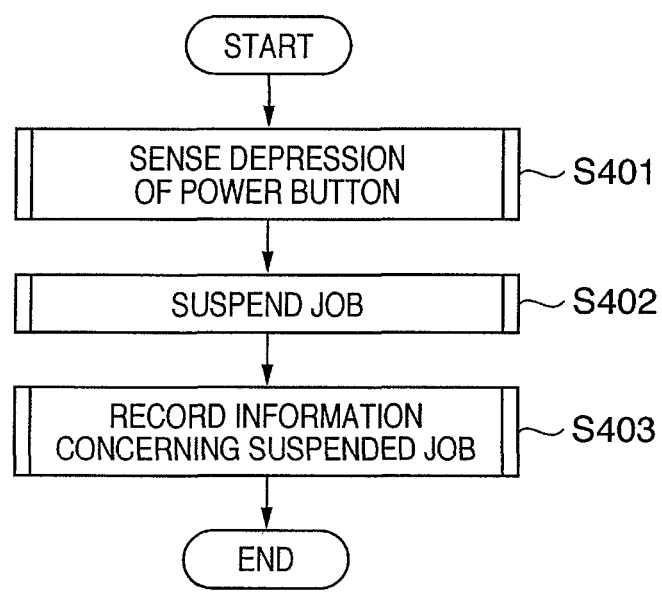
FIG. 4 is a flowchart illustrating control when power is cut off during execution of a job in this embodiment.

FIG. 4 is a flowchart illustrating control at cut-off of power during execution of a job in this embodiment. If the user presses the power key 205 in step S401, the CPU 1001 senses depression of the power key 205 via the control panel 1008. Next, in S402, the CPU 1001 suspends the job being executed and then records execution information of the suspended job in S403. That is, execution information that has been written to the RAM 1003 during execution of the job is written to the SRAM 1009. It should be noted that the hard-disk drive 1004 may be used instead of the SRAM 1009. More specifically, non-volatile storage unit capable of retaining information even at cut-off of power, such as the SRAM 1009 and hard-disk drive 1004, can be applied as the destination to which the execution information is written. An example using the SRAM 1009 as the medium that stores the execution data of the suspended job will be described below.

It has been described that processing from step S402 onward is executed in operative association with depression of the power key 205. However, it may be so arranged that processing from step S402 onward is executed in operative association with a power cut-off instruction from an external host, by way of example. Further, it may be so arranged that processing from step S402 onward is executed by sensing a power cut-off instruction internally of the image processing apparatus in accordance with timekeeping processing by a power cut-off timer provided in the image processing apparatus. Further, it may be so arranged that processing from step S402 onward is executed by power from a charged battery in operative association with accidental cut-off of power owing to a power failure or the like.

FIG. 5 illustrates an example of job execution information in this embodiment. The execution information shown in FIG. 5 corresponds to execution information written to the RAM 1003 or, in S403 in FIG. 4, to the SRAM 1009. Further, the information corresponds to information indicating the status of execution when a job is suspended. In FIG. 5, reference numeral 1102 denotes a specific job ID, which has been assigned to the job, within the device. The job ID is assigned when the job is started (when the job is generated). Reference numeral 1103 denotes the type of job, such as "SCAN TO SEND" (a job in which image data that has been read from a document is transmitted to another personal computer or device) and "SCAN TO PRINT" (a job in which image data that has been read from a document is printed). Reference numeral 1104 denotes an execution phase representing the status of progress of a job at the time of power cut-off. For example, if a job is a "SCAN TO SEND" then there are two phases, namely a phase ("BEFORE END OF SCAN") before reading of the entire document ends and a phase ("AFTER END OF SCAN") after reading of the entire document ends. Thus, a job in this embodiment is composed of a plurality of processing phases, and the execution information shown in FIG. 5 includes execution-status information indicating which processing phase is being executed. Reference numeral 1105 denotes the path (storage location) of the folder of an image file that has been read from the document. This indicates the directory of the hard-disk drive 1004 in which the image data read from the document has been stored. The directory is created when the job is started (namely at the time of job generation). Reference numeral 1106 denotes the directory and file name of the hard-disk drive 1004 at which job settings information, which is described by the job operating instructions specified by the user, has been stored. Various job process content such as stapling is included in the job operation instructions. Further, the file is created when the job is started (namely at the time of job generation). It should be noted that the job execution information in this embodiment is provided for the purpose of control at such time that job execution is suspended. When the job ends normally, therefore, this information is deleted from the RAM 1003.

[Control at Cut-Off of Power]

Figure 6:
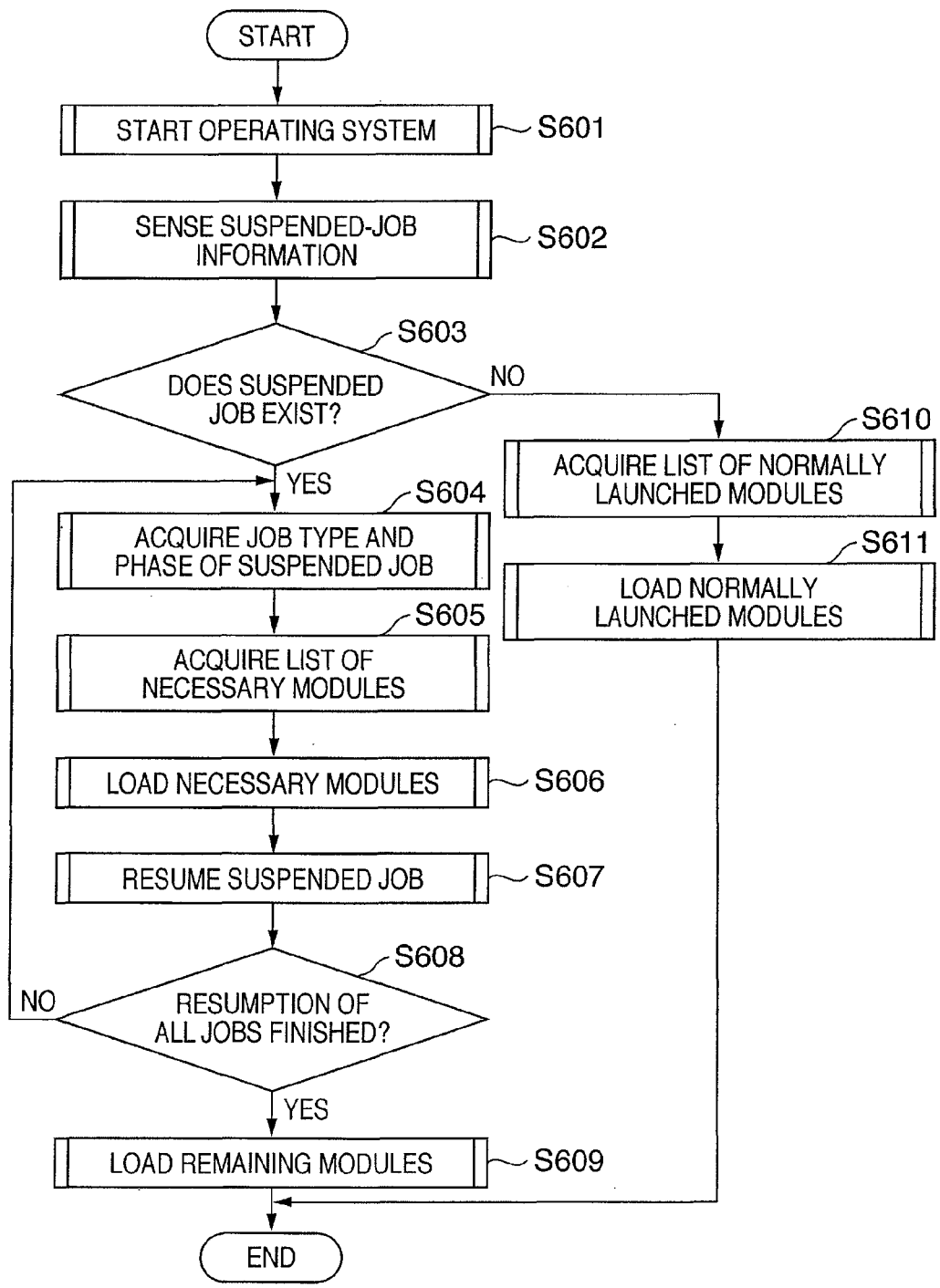
FIG. 6 is a flowchart illustrating control when power is introduced in this embodiment.

FIG. 6 is a flowchart illustrating control when power is introduced according to this embodiment. The control indicated in this flowchart is executed by the CPU 1001.

When power is supplied to the CPU 1001, the operating system is read from the hard-disk drive 1004 and booted in S601. Various device drivers and middleware are started up as well. Power is supplied to the scanner engine 1006 and printer engine 1007 also at this time and these are started up independently.

Next, in S602, a search is conducted to determine whether the execution information 1101 shown in FIG. 5 has been stored in the SRAM 1009. If this information is detected, then it is read out and stored in the RAM 1003.

Next, in S603, whether the execution information 1101 was detected in S602, that is, whether a suspended job exists, is determined. If a suspended job exists, then control proceeds to S604; otherwise, control proceeds to S610.

In S604, the CPU 1001 acquires the job type 1103 regarding the suspended job described first in the execution information 1101, and the execution phase 1104 indicating which phase regarding the specific job type is currently being executed. In S605, based on the acquired job type 1103 and execution phase 1104, the CPU 1001 specifies and acquires a list of software modules, which will be necessary for resumption processing, from a combined list of software modules stored on the hard-disk drive 1004.

FIG. 7 illustrates an example of a combined list of software modules. This corresponds to relational information that relates each type of job and each software module. The relational information has been stored on the hard-disk drive 1004, etc. When reference is made to this information, it is loaded in the RAM 1003 temporarily. In the combined list of software modules illustrated in FIG. 7, reference numeral 1202 denotes the type of job and reference numeral 1203 the phase representing the status of job progress. Further, reference numeral 1204 denotes the directory and file name of the hard-disk drive 1004 at the storage location of a software module necessary in each phase 1203.

Next, from the list of software modules acquired in S605, the CPU 1001 reads out and launches modules preferentially from the hard-disk drive 1004 in S606 with the exception of modules that have already been started up. The reading and launching of modules basically is executed in accordance with the order of the jobs described in the execution information illustrated in FIG. 5.

The start-up of necessary modules in S606 will now be described in detail with reference to FIGS. 5 and 7.

First, at resumption of a job whose job ID is 2001 at the beginning of the execution information 1101 shown in FIG. 5, the necessary software modules have not yet been started up. In accordance with FIG. 5, the job type 1103 of job ID 2001 is "SCAN TO SEND", and the execution phase 1104 is "AFTER END OF SCAN". Therefore, according to FIG. 7, the modules that are to be executed at the time of resumption are a transmit module and an image management module. In other words, if attention is directed solely to job ID 2001, start-up of a scan module and a control screen module does not take priority. In this case, therefore, the transmit module, which is for e-mail transmission or FTP transmission of image data via the network interface 1005, and the image management module, which is for handling image data from the hard-disk drive 1004, are started up.

Next, at resumption of a job whose job ID is 2002, the transmit module and image management module have already been started up; this took place at resumption of the job whose job ID is 2001. In accordance with FIG. 5, the job type 1103 of job ID 2002 is "SCAN TO SEND", and the execution phase 1104 is "BEFORE END OF SCAN". Therefore, according to FIG. 7, the modules that are to be executed at the time of resumption are scan, transmit, image management and control screen modules. In this case, therefore, the scan module, which is for creating image data by reading a document using the scanner engine 1006, and the control screen module, which is for controlling the control panel 1008, are started up. The transmit module and the image management module, which have already been started up, are excluded from start-up.

When the necessary modules have been started up successively in S606 in accordance with the order of the jobs described in the execution information of FIG. 5, as set forth above, suspended jobs are resumed one after another in S607. Resumed jobs are executed in accordance with a processing procedure decided beforehand by the combination of the job type and the execution phase.

By way of example, first the job of job ID 2001 shown in FIG. 5 is resumed. The job type 1103 is "SCAN TO SEND" and the execution phase 1104 is "AFTER END OF SCAN". In this case, an image file is read out of directory "/IMAGE/2001" of the hard-disk drive 1004 indicated in image folder 1105, and this image file is transmitted via the network interface 1005 to the destination described in the job settings information file 1106. The information concerning job ID 2001 is deleted from the execution information 1101, internal image data regarding the directory "/IMAGE/2001" of the hard-disk drive 1004 is erased and this directory is deleted.

Figure 8:
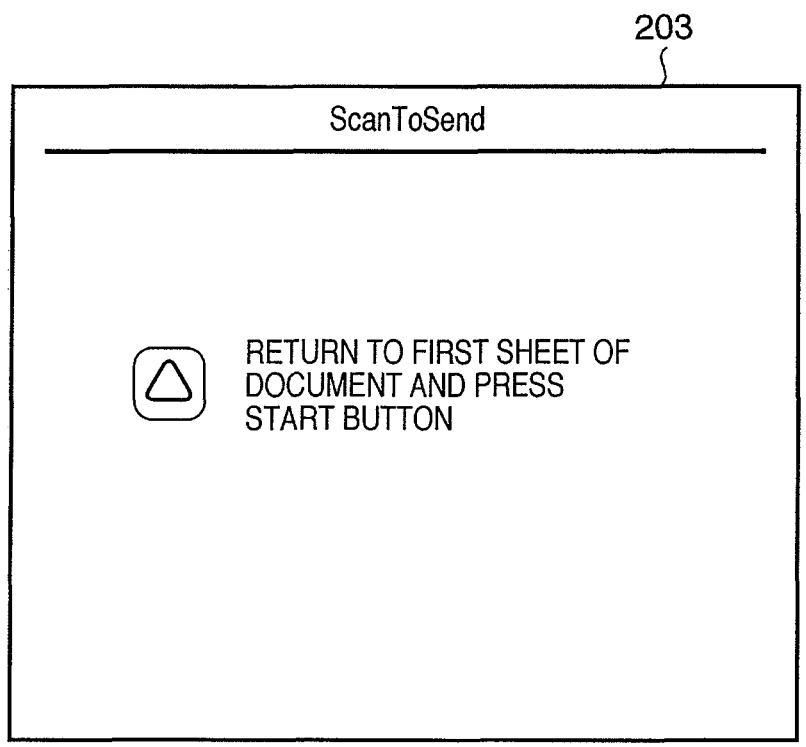
FIG. 8 is a diagram illustrating an example of a screen, which is displayed on a touch-sensitive panel, for resuming the reading of a document according to this embodiment.

Next, the job of job ID 2002 is resumed. The job type 1103 is "SCAN TO SEND" and the execution phase 1104 is "BEFORE END OF SCAN". In this case, end of start-up of the scanner engine 1006 is awaited and then a screen for resuming reading of the document is displayed on the touch-sensitive panel 203 of control panel 1008. As illustrated by way of example in FIG. 8, a message prompting the user to resume the reading of the document is displayed on the resumption screen. If the user responds to this message by pressing the start key 202, the document is read by the scanner engine 1006 and the data created is stored in directory "/IMAGE/2002" of the hard-disk drive 1004 indicated in the image folder 1105. The execution phase 1104 is rewritten to "AFTER END OF SCAN". An image file is read out of directory T "/IMAGE/2002" and this image file is transmitted via the network interface 1005 to the destination described in the job settings information file 1106. The information concerning job ID 2002 is deleted from the execution information 1101, internal image data regarding the directory "/IMAGE/2002" of the hard-disk drive 1004 is erased and this directory is deleted.

It is determined in S608 whether resumption or preparation for resumption of all suspended jobs described in the execution information 1101 has ended. If resumption of all suspended jobs has ended, control proceeds to S609; otherwise, control proceeds to S604.

In S609, modules other than software modules that have been started up by resumption processing thus far are loaded from the hard-disk drive 1004 to the RAM 1003 and started up. It should be noted that it is assumed that the processing of a suspended job that has been resumed is executed in parallel with the resumption processing in S609. In this embodiment, a start-up module list indicated by directories and file names in the hard-disk drive 1004 is provided as a list of necessary modules to be started up. An example of this start-up module list is illustrated in FIG. 9. In accordance with the example of the execution information 1101 illustrated in FIG. 5, the image management, transmit, scan and control screen modules have already been started up and therefore modules other than the image management, transmit, scan and control screen modules illustrated in a start-up module list 1301 in FIG. 9 are started up. That is, a FAX module for controlling the facsimile unit 1010 to send and receive image data to and from another facsimile apparatus via a telephone line is started up. Furthermore, a print module for communicating with the printer engine 1007 to print image data on a paper medium is started up. A RIP module for interpreting PDL data and converting it to image data is also started up.

On the other hand, in a case where it is determined in S603 that a suspended job does not exist, the start-up module list 1301 illustrated in FIG. 9 and stored on the hard-disk drive 1004 is acquired in S610. This is followed by S611, in which all modules described in the start-up module list 1301 acquired in S610 are loaded from the hard-disk drive 1004 and started up in accordance with the usual procedure.

It should be noted that in the description rendered above with reference to FIG. 6, all necessary software modules are loaded in S606 from the hard-disk drive 1004 to the RAM 1003 in conformity with the job IDs included in the execution information of FIG. 5, and then the processing of S607 is executed. However, the present invention is not limited to this example. More specifically, it may be so arranged that first the necessary software modules are loaded in S606 with regard solely to the initially noticed job ID 2001 and not with regard to all jobs, and the processing of S607 is executed immediately. In this case, the processing of S607 is executed with regard to job ID 2001 in parallel with the execution of the processing of S606 regarding the next job ID 2001. When the load processing of the necessary software modules in S606 is completed with regard to ID 2002, the processing of S607 is executed with regard to ID 2002 and the decision processing in S608 is executed.

Thus, in accordance with this embodiment as described above, a group of software modules necessary for job resumption is started up preferentially in a case where a suspended job exists when supply of power starts. This unit that the time needed to resume execution of a suspended job is shortened. By thus resuming a suspended job more quickly, the time it takes to enable execution of a new job is shortened as well. This makes it possible to improve the productivity of the overall apparatus.

Second Embodiment

A second embodiment according to the present invention will now be described.

The method illustrated in the first embodiment set forth above is such that when a suspended job is resumed, the job is resumed in accordance with the order described in an execution information list, without relation to the job type. The second embodiment is characterized in that suspended jobs are resumed successively from a job type that has become executable.

The second embodiment will be described taking as an example a case where execution information that is written to the SRAM 1009 at cut-off of power is execution information 1501 illustrated in FIG. 11.

[Control at Cut-Off of Power]

Figure 10:
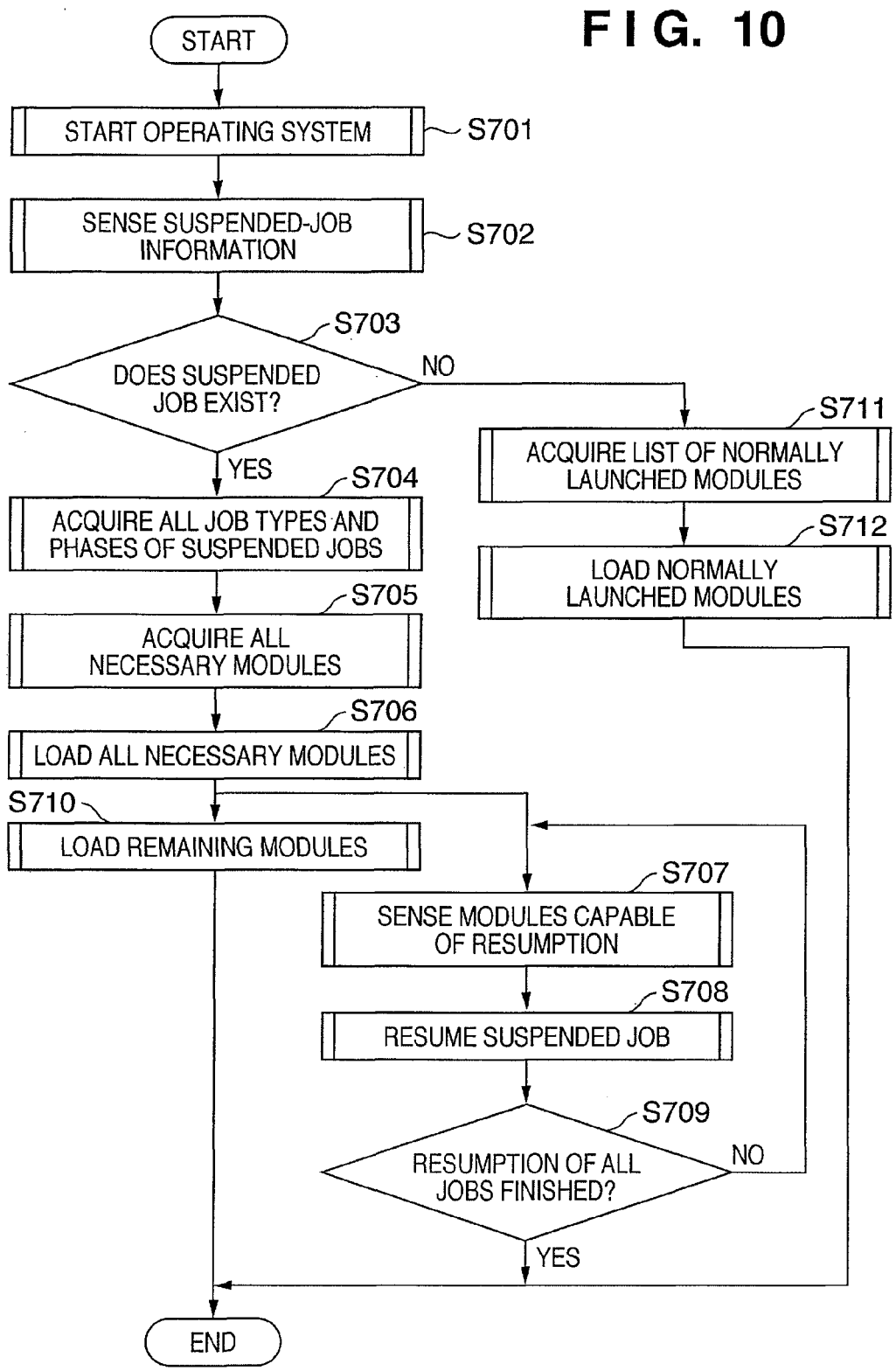
FIG. 10 is a flowchart illustrating control when power is introduced according to a second embodiment.

FIG. 10 is a flowchart illustrating control when power is introduced according to this embodiment. The control indicated in this flowchart is executed by the CPU 1001.

When power is supplied to the CPU 1001, the operating system is read from the hard-disk drive 1004 and booted in S701. Various device drivers and middleware are started up as well. Power is supplied to the scanner engine 1006 and printer engine 1007 also at this time and these are started up independently.

Figure 11:
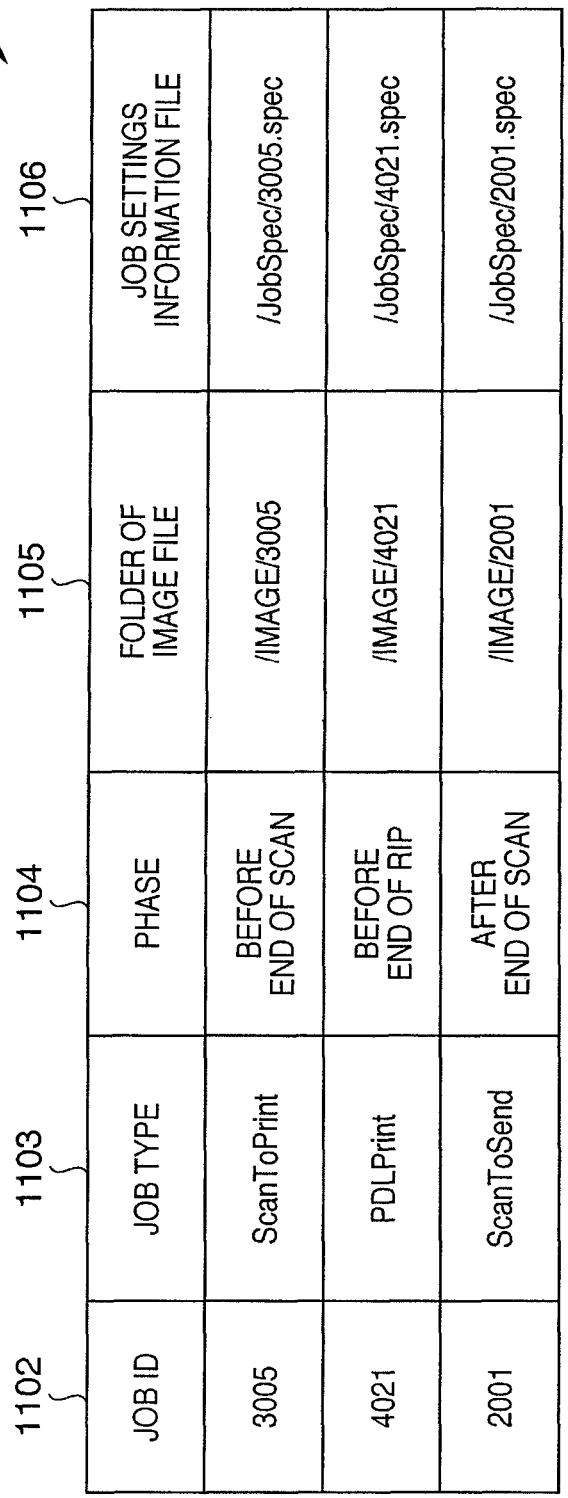
FIG. 11 is a diagram illustrating an example of job execution information in the second embodiment.

Next, in S702, a search is conducted to determine whether the execution information 1501 shown in FIG. 11 has been stored in the SRAM 1009. If this information is detected, then it is read out and stored in RAM 1003.

Next, in S703, whether the execution information 1501 was detected in S702, i.e., whether a suspended job exists, is determined. If a suspended job exists, then control proceeds to S704; otherwise, control proceeds to S711.

In S704, the CPU 1001 acquires the job types 1103 and the execution phases 1104 regarding all suspended jobs described in the execution information 1501. In S705, on the basis of all job types 1103 and execution phases 1104, the CPU 1001 specifies and acquires a list of software modules, which will be necessary for resumption processing, from a combined list of software modules stored on the hard-disk drive 1004. It should be noted that this combined list of software modules comprises the content shown in FIG. 7 similar to that illustrated in the first embodiment.

Next, from the list of software modules acquired in S705, the CPU 1001 reads out and launches modules preferentially from the hard-disk drive 1004 in S706 with the exception of modules that have already been started up. Control shifts to S707 and a thread that activates S710 is started up concurrently.

Global start-up of the necessary modules in S706 will be described in detail with reference to FIGS. 11 and 7.

In accordance with FIG. 11, the job type 1103 of job ID 3005 is "SCAN TO PRINT, and the execution phase 1104 is "BEFORE END OF SCAN". Therefore, according to FIG. 11, the modules that are to be executed at the time of resumption of job ID 3005 are scan, print, image management and screen control modules. All of these modules are started up.

With regard to job ID 4021, the job type 1103 is PDL Print and the execution phase 1104 is "BEFORE END OF RIP". In accordance with FIG. 7, therefore, the RIP module, which is necessary at the time of resumption and has not yet been started up, is started up.

With regard to job ID 2001 in FIG. 11, the job type 1103 is "SCAN TO SEND" and the execution phase 1104 is "AFTER END OF SCAN". In accordance with FIG. 7, therefore, the as yet unstarted module necessary at the time of resumption is started up.

AInS707, the apparatus waits for each software module started up in S706 to become usable, and control proceeds to S708 when resumption of a suspended job becomes possible with regard to any job type. In a case where use is made of a device such as the printer engine 1007 or scanner engine 1006, the modules do not become usable until start-up of these devices is completed. This unit that jobs are not necessarily resumed in the order set forth in the execution information 1501.

All suspended jobs of job types that have become capable of being resumed are read out of the execution information 1501 and resumed in S708. It should be noted that in a case where there are a plurality of jobs of the same job type, resumption of suspended jobs among these jobs is performed in accordance with job order set forth in the execution information. Resumed jobs are executed in accordance with a processing procedure decided beforehand by the combination of job type and execution phase.

By way of example, in a case where start-up of the scanner engine 1006 or printer engine 1007 and PDL processor 1011 takes time, the job of job ID 2001 is resumed before the job of job ID 3005 or 4021 illustrated in FIG. 11. The reason for this is that start-up of the scan and print modules is required in order to resume job ID 3005, and start-up of the print and RIP modules is required in order to resume job ID 4021. By contrast, start-up of these modules is not required for job ID 2001 and therefore job ID 2001 is capable of being resumed earlier.

The details of the resumption operation in this case will be now be described.

First, the job type 1103 of job ID 2001 in FIG. 11 is "SCAN TO SEND" and the execution phase 1104 is "AFTER END OF SCAN". In this case, an image file is read out of directory "/IMAGE/2001" of hard-disk drive 1004 indicated in image folder 1105, and this image file is transmitted via the network interface 1005 to the destination described in the job settings information file 1106. The information concerning job ID 2001 is deleted from the execution information 1501, internal image data regarding the directory "/IMAGE/2001" of hard-disk drive 1004 is erased and this directory is deleted.

Figure 12:
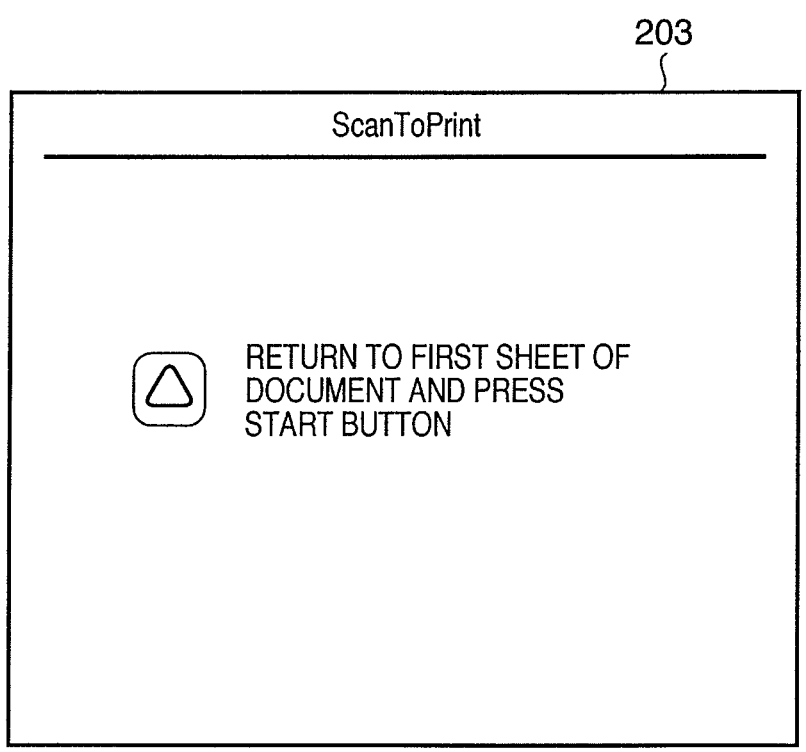
FIG. 12 is a diagram illustrating an example of a screen, which is displayed on a touch-sensitive panel, for resuming the reading of a document according to the second embodiment.

Thereafter, when start-up of the scanner engine 1006 is completed, the scan module becomes usable and the job of job ID 3005, the phase of which is "BEFORE END OF SCAN", is resumed. At this time the job type 1103 of job ID 3005 is "SCAN TO PRINT and the execution phase 1104 is "BEFORE END OF SCAN", and therefore the screen for resuming reading of the document is displayed on the touch-sensitive panel 203 of control panel 1008. As illustrated by way of example in FIG. 12, a message prompting the user to resume the reading of the document is displayed on the resumption screen. If the user responds to this message by pressing the start key 202, the document is read by the scanner engine 1006 and the data created is stored in directory "/IMAGE/3005" of hard-disk drive 1004 indicated in image folder 1105. The execution phase 1104 is rewritten to "AFTER END OF SCAN" and the apparatus waits for the print module to become usable.

Next, if start-up of the PDL processor 1011 is completed, then the RIP module becomes usable and the job of job ID 4021, for which the PDL data has already been received and whose phase is "BEFORE END OF RIP", is resumed. At this time the job type 1103 of job ID 4021 is "PDL PRINT" and the execution phase 1104 is "BEFORE END OF RIP". Accordingly, the PDL data file described in the job settings information file 1106 is read out of the hard-disk drive 1004 and is transferred to the PDL processor 1011. Image data resulting from the conversion performed by the PDL processor 1011 is stored in the directory "/IMAGE/4021" of hard-disk drive 1004 indicated in image folder 1105. The execution phase 1104 is rewritten to "AFTER END OF RIP" and the apparatus waits for the print module to become usable.

If start-up of the printer engine 1007 is completed, then the print module becomes usable and the job that was waiting for start-up of this module is resumed in the order in which the job entered the queue.

First, the printing operation based on the job of job ID 3005 is started. That is, image data is read from the directory "/IMAGE/3005" of hard-disk drive 1004 and is sent to the printer engine 1007, whereby printing of the image is executed. When printing ends, the information concerning job ID 3005 is deleted from the execution information 1501, internal image data regarding the directory "/IMAGE/3005" of hard-disk drive 1004 is erased and this directory is deleted.

Next, the printing operation based on the job of job ID 4021 is started. That is, image data is read from the directory "/IMAGE/4021" of hard-disk drive 1004 and is sent to the printer engine 1007, whereby printing of the image is executed. When printing ends, the information concerning job ID 4021 is deleted from the execution information 1501, internal image data regarding the directory "/IMAGE/4021" of hard-disk drive 1004 is erased and this directory is deleted.

It is determined in S709 whether resumption of all suspended jobs described in the execution information 1501 has ended. If resumption of all jobs has ended, then resumption processing is terminated; otherwise, control returns to S707.

Modules that have not yet been started up are started up in S710 in parallel with the suspended-job resumption processing indicated in S707 to S709 above. In a manner similar to the first embodiment, the second embodiment also has the start-up module list 1301 illustrated in FIG. 9 as the group of modules requiring start-up. Accordingly, in S710, modules other than software modules that have been started up thus far from within the start-up module list 1301 of FIG. 9 are loaded from hard-disk drive 1004 and started up. For example, in this case, since the image management, transmit, scan, control screen, print and RIP modules have already been started up, the FAX module, which is still inactive, is started up.

On the other hand, if it is determined in S703 that a suspended job does not exist, the start-up module list 1301 illustrated in FIG. 9 and stored on the hard-disk drive 1004 is acquired in S711. This is followed by S712, at which all modules described in the start-up module list 1301 acquired in S711 are loaded from the hard-disk drive 1004 and started up.

The second embodiment illustrates an example in which the "SCAN TO PRINT" job of job ID 3005 or the PDL print job of job ID 4021 is resumed without waiting for start-up of the printer engine 1007. However, the present invention is not limited to this example. For instance, a job may be resumed at the moment all necessary software modules become usable.

Thus, in accordance with the second embodiment as described above, in a case where a plurality of suspended jobs exist when power starts being supplied, a group of software modules necessary for resumption of all jobs is loaded and started up preferentially, and job resumption is performed successively from jobs that have become executable. In comparison with the first embodiment, therefore, the time needed to re-execute all suspended jobs can be minimized.

Modifications

In the first and second embodiments, an example in which reading of a document is specified by an operation performed at the control panel 1008 is illustrated. However, it may be so arranged that this is specified by access from an external host such as a personal computer connected via a network.

Further, in each of the foregoing embodiments, a case where the image forming apparatus is a copier is described. However, the present invention is applicable in similar fashion and the functions of the foregoing embodiments can be implemented also in cases where a printer apparatus or facsimile apparatus is used.

In each of the foregoing embodiments, a case where a printer (printer engine) is a laser printer is described. However, the present invention is similarly applicable to other types of printing schemes. Examples of other printing schemes that can be mentioned are electrophotographic schemes other than laser-type schemes (e.g., LED schemes), liquid-crystal shutter schemes, ink-jet schemes, thermal-transfer schemes and sublimation schemes, etc.

Other Embodiments

Although embodiments have been described above, it is possible for the present invention to take on various forms such as a system, apparatus, method, program or storage medium (recording medium). More specifically, the present invention may be applied to a system constituted by a plurality of devices (e.g., a host computer, interface, image sensor web application, etc.) or to an apparatus comprising a single device (e.g., a copier or facsimile machine, etc.).

The present invention may also be attained by supplying a software program, which implements the functions of the foregoing embodiments, directly or remotely to a system or apparatus, reading the supplied program code with a computer of the system or apparatus, and then executing the program code. The program in this case is a program that corresponds to the flowcharts illustrated in the drawings of the embodiments.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer is connected to a website on the Internet using a browser possessed by the client computer, and the computer program per se of the present invention (or a compressed file that includes an automatic installation function) is downloaded to a recording medium such as a hard disk. Further, implementation is possible by dividing the program codes constituting the program of the present invention into a plurality of files and downloading the files from different websites. In other words, a WWW server that downloads, to multiple users, the program files that implement the functional processing of the present invention by computer also is covered by the present invention.

Further, it is also possible to encrypt and store the program of the present invention on a storage medium such as a CD-ROM, distribute the storage medium to users and allow users who meet certain requirements to download decryption key information from a website via the Internet. That is, the user can execute the program decrypted using this key information and install the program on a computer.

Further, a computer executes a read program to thereby implement the functions of the above-described embodiments. Furthermore, an operating system or the like running on a computer executes some or all of the actual processing based on commands in the program and the functions of the above-described embodiments can be implemented by this processing.

Furthermore, after the program read from the recording medium is written to a memory provided on a function expansion board inserted into the computer or provided in a function expansion unit connected to the computer, the functions of the above-described embodiments are implement by executing the program. That is, a CPU or the like mounted on the function expansion board or function expansion unit performs all or a part of the actual processing based on the commands in the program.

In accordance with the present invention constructed as set forth above, if a suspended job is found to exist when power starts being supplied, a group of software modules necessary for resumption of the job is loaded and started up preferentially. This makes it possible to shorten the time required until the suspended job is resumed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-160312, filed Jun. 8, 2006, which is hereby incorporated by reference herein in its entirety.

What is claimed is:

1. An image processing apparatus comprising:
a non-volatile storage unit constructed to store job information indicating a job which is suspended, wherein the job information is stored in the non-volatile storage unit even when a power supply of the image processing apparatus is shut off;
a determination unit constructed to determine, based on the job information stored in the non-volatile storage unit, a software module, which is related to the suspended job, preferentially activated when the image processing apparatus is powered on;
a control unit constructed to load, based on the determination of the determination unit, the determined software module required for executing the suspended job before loading of another software module required for executing another job being different from a type of the suspended job, which is not suspended in a case where the power is supplied to the image processing apparatus, and to execute the suspended job based on the loaded software module required for executing for executing the suspended job.

2. The apparatus according to claim 1, wherein the suspended job is composed of a plurality of processing phases, and the job information includes information representing the job type of the suspended job and the processing phase of the suspended job.

3. The apparatus according to claim 2, wherein the job information of the suspended job further includes information representing the position and process content of the suspended job.

4. The apparatus according to claim 1, wherein said control unit loads the software module relating to the suspended job based on previously set relational information relating the suspended job and software modules.

5. The apparatus according to claim 4, wherein the relational information relating the suspended job and software modules indicates software modules necessary for every processing phase of the suspended job.

6. The apparatus according to claim 1, wherein said control unit loads software modules in a previously set job order to execute the suspended job.

7. The apparatus according to claim 1, wherein said control unit loads, based on the determination of the determination unit, software modules for executing a plurality of suspended jobs and executes the plurality of suspended jobs successively from jobs that are capable of being executed.

8. A method for controlling an image processing apparatus, said method comprising:
storing, in a non-volatile storage unit, job information indicating a job which is suspended, wherein the job information is stored in the non-volatile storage unit even when a power supply of the image processing apparatus is shut off;
determining, based on the job information stored in the non-volatile storage unit, a software module, which is related to the suspended job, preferentially activated when the image processing apparatus is powered on;
loading, based on the determining, the determined software module required for executing the suspended job before loading of another software module required for executing another job which is different from a type of the suspended job and is not suspended in a case where the power is supplied to the image processing apparatus; and
executing the suspended job based on the loaded software module required for executing for executing the suspended job.

9. The method according to claim 8, wherein the suspended job is composed of a plurality of processing phases, and the job information includes information representing the job type of the suspended job and the processing phase of the suspended job.

10. The method according to claim 9, wherein the job information of the suspended job further includes information representing the position and process content of the suspended job.

11. The method according to claim 8, wherein said control unit loads the software module relating to the suspended job based on previously set relational information relating the suspended job and a plurality of software modules.

12. The method according to claim 11, wherein the relational information relating the suspended job and the software modules indicates the plurality of software indicates the software modules necessary for every processing phase of the suspended job.

13. The method according to claim 8, wherein the loaded software modules are loaded in a previously set job order to the suspended job.

14. The method according to claim 8, wherein a plurality of software modules for executing a plurality of suspended jobs are loaded, based on the determining, and the plurality of suspended jobs are executed successively from jobs that are capable of being executed.

15. A non-transitory computer-readable recording medium for storing a computer program for causing a computer of the image processing apparatus to execute the method set forth in claim 8.

16. An image processing apparatus comprising:
a receiving unit constructed to receive an instruction for shutting off a power supply of the image processing apparatus;

a storing unit constructed to store job information indicating a job which is suspended when the receiving unit receives the instruction, wherein the job information is stored in the storing unit even when the power supply of the image processing apparatus is shut off;

a first determination unit constructed to determine, based on the job information stored in the storing unit, a software module, which is related to the suspended job, preferentially activated when the image processing apparatus is powered on;

a loading unit constructed to load, based on the determination of the first determination unit, the determined software module required for executing the suspended job before loading of another software module required for executing another job which is different from a type of the suspended job and is not suspended in a case where the power is supplied to the image processing apparatus; and an executing unit constructed to resume the suspended job based on the loaded software module required for executing the suspended job.

17. The apparatus according to claim 16, a second determination unit constructed to determine whether or not the suspended job to be executed exists based on the job information stored by the storing unit, wherein in a case where the second determination unit has determined that the suspended job exists, the loading unit loads the software module required for executing the suspended job before loading of the another software module required for executing the another job, and in a case where the second determination unit has determined that the suspended job does not exist, the loading unit loads software modules in a predetermined order.

18. The apparatus according to claim 16, the job information includes a job type of the suspended job, and the loading unit loads the software module required for executing the suspended job in the order determined based on the suspended job type.

19. An image processing method comprising:

a receiving step of receiving an instruction for shutting off a power supply of the image processing apparatus;

a storing step of storing job information indicating a job which is suspended when the receiving step receives the instruction, wherein the job information is stored in a storage unit even when the power supply of the image processing apparatus is shut off;

a first determining step of determining, based on the job information stored in the storage unit, a software module, which is related to the suspended job, preferentially activated when the image processing apparatus is powered on;

a loading step of loading, based on the determination of the first determination step, the determined software module required for executing the suspended job before loading of another software module required for executing another job which is different from a type of the suspended job and is not suspended in a case where the power is supplied to the image processing apparatus; and an executing step of resuming the suspended job based on the loaded software module required for executing the suspended job.

20. The method according to claim 19, a second determination step of determining whether or not the suspended job exists based on the job information stored in the storing step;

wherein in a case where the second determination step has determined that the suspended job exists, the loading step loads the software module required for executing the suspended job before loading of the another software module required for executing the another job, and in a case where the second determination step has determined that the suspended job does not exist, the loading steps loads software modules in a predetermined order.

21. The method according to claim 19, the job information includes a job type of the suspended job, and the loading unit loads the software module required for executing the suspended job in the order determined based on the suspended job type.

22. A non-transitory computer-readable recording medium for storing a computer program for causing a computer of the image processing apparatus to execute the method set forth in claim 19.

* * * * *